Patented Feb. 21, 1950

2,498,473

UNITED STATES PATENT OFFICE 2,498,473

VINYL COMPOUNDS AND THEIR PREPARATION

Royal K. Abbott, Jr., Pittsfield, Mass., assignor to General Electric Company, a corporation of New York No Drawing. Application December 11, 1944, Serial No. 567,784

12 Claims. (Cl. 260—346)

The present invention relates broadly to vinyl compounds, and more specifically to the preparation of vinyl-substituted dibenzofurans.

The preparation of vinyl aromatic compounds of high molecular weight presents many difficulties because of the high boiling points of such compounds even under greatly reduced pressure, which causes the compounds to polymerize at temperatures below their boiling points, and because of the possibly high melting points of some of the intermediates involved. In general, the methods which are applicable to the production of vinyl compounds of low molecular weight are not suitable for the synthesis of high molecular weight aromatic compounds, and new techniques have had to be devised for their synthesis. N-vinylcarbazole is a special instance, which compound may be prepared by the direct reaction of acetylene, a reaction which is peculiar to the active hydrogen on the nitrogen atom. The present invention provides a novel method of general applicability for the production of vinyl compounds from all aromatic and substituted aromatic nuclei, which readily undergo the Friedel-Crafts reaction. The invention will be more specifically illustrated with reference to the preparation of the novel compound, 2-vinyldibenzofuran:

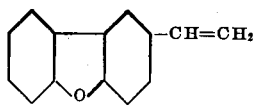

Dibenzofuran (also known as diphenylene oxide) readily undergoes the Friedel-Crafts reaction with either acetyl chloride or acetic anhydride in the presence of aluminum chloride. The chief product is 2-acetyldibenzofuran.

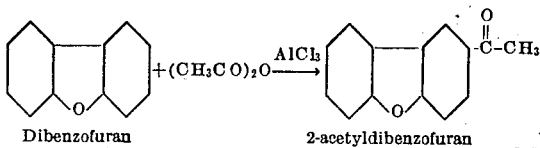

Dibenzofuran     2-acetyldibenzofuran

The dibenzofuran is dissolved in carbon disulfide and reacted with either acetyl chloride or acetic anhydride, preferably the latter. Small amounts of 2,8-diacetyldibenzofuran are obtained and some triacetyldibenzofuran, and possibly even more highly substituted products. All of these by-products may be reduced and converted to compounds which polymerize to yield polymers with properties which differ markedly from those obtained when the monovinyl compound is polymerized. Vinyl compounds such as these also undergo cross-linkage upon polymerization with the formation of copolymers having useful physical properties.

The 2-acetyldibenzofuran is reduced catalytically by high pressure hydrogenation according to the following equation:

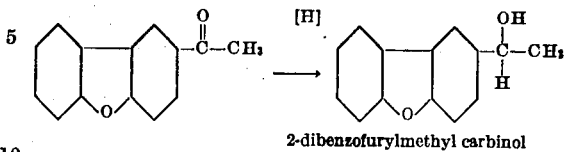

2-dibenzofurylmethyl carbinol

The high pressure hydrogenation is carried out in the presence of a catalyst, converting the monoketone to 2-dibenzofurylmethyl carbinol. This secondary carbinol is separated from small amounts of by-products by distillation at 180° C. at 1 mm. pressure. At higher pressures the carbinol boils with some decomposition, water being split out. This dehydration increases as the distillation pressure, and consequently the temperature, is raised. The carbinol boils with slight decomposition at 194° C. at 7 mm. and 205° C. at 12 mm. pressure. It is not necessary to dry or redistill the carbinol since it is obtained in a state of high purity by the single distillation.

The next step in the process is the conversion of the 2-dibenzofurylmethyl carbinol into 2-vinyldibenzofuran. This may be done either by direct vapor phase catalytic dehydration or by reaction of the secondary carbinol with thionyl chloride ($SOCl_2$) and treatment with alcoholic caustic or pyridine.

The direct vapor phase catalytic dehydration is the preferred method and consists in passing the vapors of the carbinol over activated alumina in a system which is maintained at a pressure of less than one millimeter of mercury. The product thus obtained is dried and filtered and may be used without further purification. The dehydration process is quantitative and the monomer shows substantially completely negative tests for ketone, carbinol and water.

The alternative method is exemplified by the following reactions:

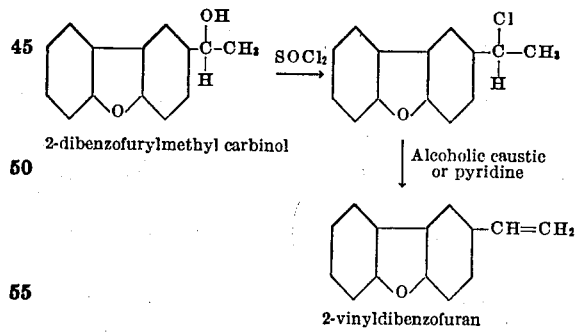

2-dibenzofurylmethyl carbinol

Alcoholic caustic or pyridine 2-vinyldibenzofuran

The 2-vinyldibenzofuran prepared by the foregoing alternative procedure may be distilled at reduced pressure in the presence of a suitable inhibitor, such as copper powder, to yield a pure product possessing a high degree of reactivity toward polymerization.

In order that those skilled in the art may better understand the present invention, the following is illustrative of the procedure which may be used in the preparation of a vinyl-substituted dibenzofuran in accordance with the present invention, and illustrative specifically of the preparation of 2-vinyldibenzofuran starting with dibenzofuran and preparing successively 2-acetyldibenzofuran, 2-dibenzofurylmethyl carbinol and finally 2-vinyldibenzofuran.

*Preparation of 2-acetyldibenzofuran*

504 gms. (3.0 mols) of dibenzofuran were placed in a 5-liter, three-necked flask, equipped with the conventional stirrer, reflux condenser and dropping funnel. 1750 ml. of carbon disulfide were then added and the mixture stirred 20 minutes to solution. The heat of solution is strongly negative. 600 gms. (4.5 mols) of anhydrous powdered aluminum chloride were then added and the mixture stirred for ½ hour, after which 258 gms. (3.3 mols) of acetyl chloride were added dropwise over a period of 6 hours. Stirring was continued and toward the end of the reaction the mixture thinned out considerably. The reaction mixture was then heated to reflux by stirring for an additional 6 hours when it no longer evolved appreciable amounts of hydrogen chloride and was then allowed to stand overnight, after which two liters of 1-1 hydrochloric acid were added very slowly. Six hours was required for the complete hydrolysis.

In order to increase the density of the lower (organic) layer, 5 pounds of carbon tetrachloride were added and the layers separated. The organic layer was filtered, washed six times with water, filtered, dried with calcium chloride and the solvents removed and stripped on a water pump. The reaction mixture was then cooled and distilled under reduced pressure.

51.2% of the fraction was recovered as the monoketone. This fraction, weighing 322 gms., was redistilled under 15 mm. pressure. The picrate of 2-acetyldibenzofuran was obtained as light yellow needles, melting point 81–83° C.

*Preparation of 2-dibenzofurylmethyl carbinol*

11 gms. (0.05 mol) of 2-acetyldibenzofuran were added to 100 ml. of absolute ethanol in a glass bomb liner. Three gms. of catalyst were added and the material was placed under 1600 pounds per square in. of hydrogen in the bomb. The temperature was then raised to 150° C. which caused the pressure to rise to 2,000 lbs. per square in. After ¾ hour at this temperature, the bomb was cooled, the hydrogen valved off and the liquid was filtered to remove the catalyst. The alcohol was boiled off and the reaction mass was stripped first on the water pump and then on the oil pump at 100° C. The product was a colorless, slightly oily liquid which gave a negative ketone test with 2,4-dinitrophenylhydrazine test reagent. The original ketone starting material gives a very strong positive test with this same reagent. The molecular weight of the 2-dibenzofurylmethyl carbinol is 212.

*Catalytic vapor phase dehydration of 2-dibenzofurylmethyl carbinol to 2-vinyldibenzofuran*

Approximately two kilograms of 2-dibenzofurylmethyl carbinol were placed in a 12-liter, three-necked copper flask provided with a "Glascol" heating mantle and carrying a column made from 2" iron pipe which was packed for an effective length of 23" with 8 to 14 mesh activated alumina and maintained at 325° C. The condenser was of metal and fed with running water in order to remove as rapidly as possible the excess heat from the distillate. The total weight of distillate obtained was 1760 gms., which represents an average rate of 10.7 gms. per minute. The product was dried over calcium chloride, filtered eight times through a quadruple filter, and finally stripped by means of an oil pump at room temperature. The Zerewitinoff test for active hydrogen was completely negative, showing that neither carbinol nor water was present as impurities in the vinyl compound. The pale yellow liquid obtained solidified readily at 0° C.

*Alternative method of preparation of 2-vinyldibenzofuran from 2-dibenzofurylmethyl carbinol*

The alternative method consists in converting the 2-dibenzofurylmethyl carbinol first to 2-α chloroethyldibenzofuran. The 2-dibenzofurylmethyl carbinol obtained as outlined above by the catalytic hydrogenation of 2-acetyldibenzofuran was diluted with 10 ml. of benzene and treated dropwise with a solution prepared from six grams (0.05 mol) of thionyl chloride dissolved in 10 ml. of benzene. Hydrogen chloride and sulfur dioxide were evolved at room temperature and the solution became warm. The addition was completed in ten minutes and the solution was then refluxed gently for five minutes to complete the reaction and to remove the dissolved gases, after which the solution was cooled.

The 2-α chloroethyldibenzofuran so obtained was added to 200 ml. of methanol. To this mixture 180 ml. of 25% KOH in methanol were added and the reaction mixture refluxed for three hours. Most of the solvent was distilled off and the residue poured on ice. It was then extracted with benzene, the benzene layer filtered and removed on the water pump with a water bath at 50° C. Distillation was conducted over three grams of fine granular copper at a pressure of 0.5 mm., the boiling point being 120° C. The yield was nine grams or 89% from the ketone, of a colorless, slightly oily liquid which gave a negative ketone test, a negative Zerewitinoff test, a negative test for halogen and a positive test with potassium permanganate for unsaturation.

The following table gives the physical and electrical properties of 2-vinyldibenzofuran:

| | |
|---|---|
| Molecular weight | 194 |
| Physical state | Pale yellow liquid or white crystalline solid, depending on purity |
| Boiling point | 164° C./7 mm., 141° C./1 mm. |
| Melting point | Approximately 30° C. |
| Index of refraction | $n_D^{25}=1.6582$ |
| Density | $d_4^{40}=1.133$ |
| Viscosity | 14 cp./25° C. |

| | 30° C. | 100° C. |
|---|---|---|
| Power Factor: | | |
| 60 cycles | 3.4 | 24 |
| 1000 cycles | 0.5 | 2.5 |
| 1 megacycle | 0.11 | 0.10 |
| Dielectric Constant: | | |
| 60 cycles | 3.3 | 3.2 |
| 1000 cycles | 3.3 | 3.1 |
| 1 megacycle | 3.3 | 3.1 |
| Leakage resistance ohm/cm. | $3.3 \times 10^{11}$ | $5.1 \times 10^{10}$ |

Dielectric constant from $n^2$ value, 2.75

As outlined above, the invention has been described with reference to the specific preparation of 2-vinyldibenzofuran as illustrative of the vinyl derivatives of dibenzofuran. The present invention provides novel means for producing this novel specific vinyl derivative of dibenzofuran. However, it is to be understood that the invention comprehends also the preparation of other isomers, such as, for example, the 4-isomer. During the course of the preparation by the Friedel-Crafts reaction of the 2-acetyldibenzofuran, 4-acetyldibenzofuran may be produced in small amounts. The latter has been obtained and identified as the ketone by all the usual ketone tests. The 4-acetyldibenzofuran is a liquid at room temperature. The boiling point lies in the neighborhood of 165° C. at 1 mm. and 210° C. at 15 mm., which is slightly below the boiling point for 2-acetyldibenzofuran. The 4-acetyldibenzofuran may be reduced to the corresponding carbinol and dehydrated to the corresponding 4-vinyldibenzofuran.

The present invention also provides means for the preparation of many substituted dibenzofuran compounds, for example, any 2-alkyldibenzofuran, such as 2-ethyldibenzofuran may be caused to readily undergo the Friedel-Crafts reaction to 2-acetyl-8-ethyldibenzofuran, which in turn may be carried through the remainder of the process to yield 2-ethyl-8-vinyldibenzofuran. Thus, the present invention is applicable for the production in a similar manner of the alkyl, aryl, alkoxy, and halogenated dibenzofuran derivatives.

Polymers may be prepared from the monomer as described and claimed in the copending application, Serial No. 567,786, filed concurrently herewith, in the names of Kern, Abbott and Brandow, and copolymers may be prepared as described and claimed in the copending application, Serial No. 567,787, filed concurrently herewith, in the name of Kern, both applications being assigned to the assignee of the present invention.

What I claim as new and desire to secure by Letters Patent of the United States is:

1. 2-vinyldibenzofuran corresponding to the formula

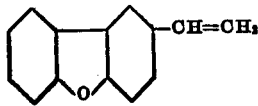

2. 4-vinyldibenzofuran corresponding to the formula

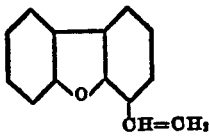

3. The process of preparing a vinyldibenzofuran which comprises hydrogenating the corresponding acetyldibenzofuran to form the secondary carbinol thereof, and converting the latter to the corresponding vinyldibenzofuran.

4. The process of preparing 2-vinyldibenzofuran which comprises acetylating dibenzofuran to obtain 2-acetyldibenzofuran by effecting reaction between dibenzofuran and acetic anhydride in the presence of aluminum chloride as a catalyst for the reaction, hydrogenating the 2-acetyldibenzofuran to form 2-dibenzofurylmethyl carbinol, and dehydrating the latter in contact with activated alumina to obtain 2-vinyldibenzofuran.

5. The process of preparing 2-vinyldibenzofuran which comprises acetylating dibenzofuran to obtain 2-acetyldibenzofuran by effecting reaction between dibenzofuran and acetic anhydride in the presence of aluminum chloride as a catalyst for the reaction, hydrogenating the 2-acetyldibenzofuran to form 2-dibenzofurylmethyl carbinol, reacting the latter with thionyl chloride to convert it to 2-α-chloroethyldibenzofuran, and dehydrochlorinating the latter to obtain 2-vinyldibenzofuran.

6. The method of preparing 2-vinyldibenzofuran which comprises dehydrating 2-dibenzofurylmethyl carbinol.

7. The method of preparing 2-vinyldibenzofuran which comprises dehydrating 2-dibenzofurylmethyl carbinol in contact with activated alumina.

8. The method of preparing 2-vinyldibenzofuran which comprises causing the vapors of 2-dibenzofurylmethyl carbinol to contact activated alumina thereby to dehydrate the 2-dibenzofurylmethyl carbinol to 2-vinyldibenzofuran.

9. The method of preparing 2-vinyldibenzofuran which comprises reducing 2-acetyldibenzofuran to 2-dibenzofurylmethyl carbinol and dehydrating the latter to obtain 2-vinyldibenzofuran.

10. The method of preparing 2-vinyldibenzofuran which comprises hydrogenating 2-acetyldibenzofuran to convert it to 2-dibenzofurylmethyl carbinol and dehydrating the latter by causing the vapors thereof to contact activated alumina thereby to obtain 2-vinyldibenzofuran.

11. The method of preparing 2-vinyldibenzofuran which comprises acetylating dibenzofuran to obtain 2-acetyldibenzofuran, hydrogenating the latter to form 2-dibenzofurylmethyl carbinol, and dehydrating the 2-dibenzofurylmethyl carbinol to obtain 2-vinyldibenzofuran.

12. A monovinyldibenzofuran corresponding to the general formula

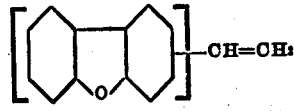

ROYAL K. ABBOTT, JR.

REFERENCES CITED

The following references are of record in the file of this patent:

UNITED STATES PATENTS

| Number | Name | Date |
|---|---|---|
| 1,997,744 | Putzer | Apr. 16, 1935 |
| 2,146,730 | Gilman | Feb. 14, 1939 |

FOREIGN PATENTS

| Number | Country | Date |
|---|---|---|
| 487,604 | Great Britain | 1938 |